Oct. 19, 1965   J. W. LYLE ETAL   3,212,914
ELECTRIC PULSE COATING PROCESS AND APPARATUS
Filed May 23, 1961

INVENTORS
JAMES W. LYLE
WILLIAM B. JOHNSON
BY William J. Mesinger
ATTORNEY

United States Patent Office 3,212,914
Patented Oct. 19, 1965

3,212,914
ELECTRIC PULSE COATING PROCESS AND APPARATUS
James W. Lyle and William B. Johnson, Indianapolis, Ind., assignors to Union Carbide Corporation, a corporation of New York
Filed May 23, 1961, Ser. No. 111,979
5 Claims. (Cl. 117—17)

The present invention relates to a high temperature, high velocity process and apparatus for applying coatings to objects and more particularly to a new method and apparatus for coating objects with dense, adherent coatings, especially of relatively high melting materials, wherein an electric pulse is utilized as the coating energy source. The method of the invention is characterized by the fact that substantially no alloying occurs between the coating material and the base object, and the coating is substantially free of oxides and/or carbides caused by oxidation and/or carburization of the coating material.

For some time now, it has been common practice to provide an object with a protective coating by flame spraying the object with a melted material that would adhere to a pre-cleaned surface of the object.

In one prior art process a detonation wave produced by igniting a detonatable mixture was employed to provide the energy source for heating up and impinging finely-divided coating particles at a high temperature and at a high velocity on a base. This prior process was quite useful for several reasons. First, the detonation reaction provides a high heat source (about 2800° C. or more) desirable to heat the particles to proper coating condition. Second, the rapidly moving detonation wave (3,000 to 13,000 ft./sec.) and its associated hot gases can eject the coating particles at a high velocity (about 2500 ft./sec.) so that they can form a strong impacted coating bond with the base. This combination of results has enabled refractory coatings of materials such as tungsten carbide, chromium carbide, and aluminum oxide to be readily applied. This prior process has a main disadvantage with respect to pure metal coatings. The detonation reaction involving mixtures such as acetylene-oxygen and hydrogen-oxygen introduces minor amounts of oxides or carbides to the coating product through reaction between the hot detonation product gases and the suspended coating particles. The temperature and velocity of the exit gases is also governed by the detonatable reaction mixtures available. This reduces the flexibility of operation somewhat.

The disadvantages of the above prior art process have been eliminated by an improved high temperature, high velocity coating process which employs a pulsed electric discharge in an inert gas atmosphere as the coating energy source.

Therefore, the present invention has as its major objective the overcoming of the above discussed disadvantages of the prior art. Among the more particular objects are: to provide a more flexible coating process; to provide a process wherein increased powder velocities are obtainable; to provide a process wherein substantially all the coating particles are effectively used in producing a desired coating; to provide a process wherein the electrical energy for the electric pulse is delivered from a capacitance.

Still other objects are: To provide novel apparatus for carrying out the invention, to provide a novel apparatus wherein the electric pulse is discharged in an elongated discharge chamber.

Other objects and advantages will be pointed out or become apparent from the following detailed description and drawings wherein.

Figure 1:
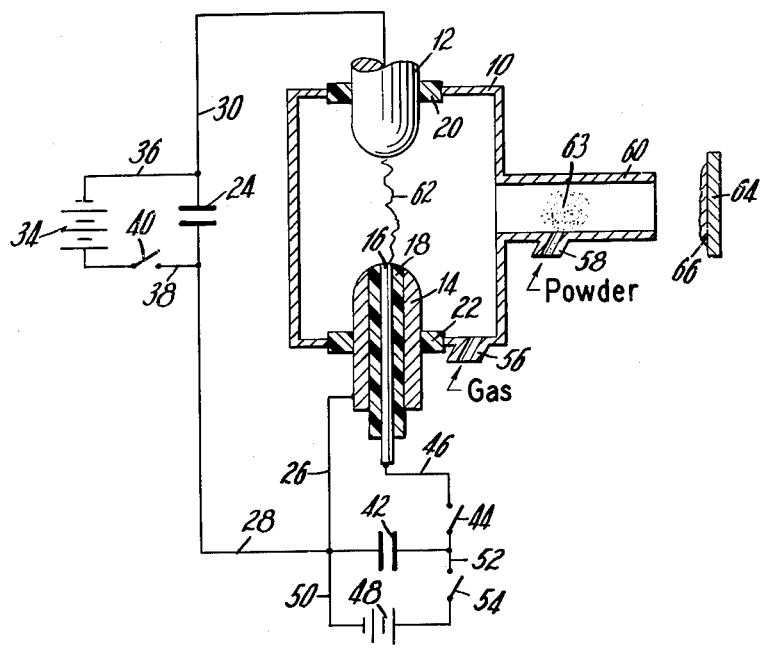
FIG. 1 shows one form of apparatus useful in making coatings along with a schematic diagram of a typical electrical circuit.

In its broadest aspects, the present invention comprises the steps of introducing at substantially atmospheric pressure an inert gas stream to a chamber having an open end, introducing to the chamber finely-divided coating material and suspending the material therein, discharging a high intensity electric pulse within the chamber so as to rapidly increase the pressure and temperature of the contained inert gas, passing the resulting shock wave and rapidly expanding hot gas along and around the suspended finely-divided material so as to eject this material from the open end of the chamber, and directing the hot, high velocity particles toward an object to be coated.

The process can be repeated as often as necessary in order to build up a desired coating thickness. In the preferred form of the invention the finely-divided coating material is introduced to a portion of the chamber downstream from the electric pulse discharge area. The inert gas used in this process prevents oxidation or carburization of the coating material during the heating-up and ejection portions of the process and also shields the hot, high velocity coating particles from atmospheric contamination prior to and during impact with the base to be coated. Since an intense electric discharge can attain very high temperatures, exceeding 10,000° C., the operating temperature of this process can be selected by varying the electric power and the volume of inert gas that is to be heated during the process. Also, by varying the apparatus dimensions and the inert gas flows to control the pressure achieved in the discharge chamber subsequent to the pulsed discharge the velocity of the exiting gases and thus the velocity of the coating process employing inert gas is considerably more flexible in operation than the prior art detonation coating process.

If argon gas is used in the electric pulse coating process, exit gas velocities of about 6600 ft./sec. can be attained, whereas if hydrogen gas is used, exit gas velocities of about 20,000 ft./sec. can be achieved. Mixtures of these and other relatively inert gases would enable intermediate velocities to be used. This flexibility in gas velocity should enable powder velocities of up to about 5000 ft./sec. to be employed. This is about double that attained in the detonation plating process.

There is a fundamental difference between the operating characteristics of the present invention and those of the prior art detonation process. In the prior process, the detonatable mixture is ignited to form a detonation wave. This detonation wave moves rapidly into the unburned gas, heating it and momentarily accelerating it to high velocity. However, since this gas is moving away from a closed end of the detonation chamber and no gas is being supplied from this end, a rarefaction wave then propagates through the hot detonation product gases tending to slow down the gases and suspended coating particles. This stagnant gas is at an elevated temperature and pressure, although somewhat below the temperature and pressure prevailing at the detonation wave. When the detonation wave leaves the muzzle of the elongated barrel of the coating apparatus, the gas now contained at high pressure in the barrel begins to rush out, as a reflected rarefaction wave from the muzzle travels back into the barrel, re-accelerating the gas in the direction of the muzzle. This sequence of events has certain consequences for a coating process. Particles originally near the muzzle of the barrel are swept out immediately behind the detonation wave, and thus they have a very short residence time in the hot gas. However, particles in the central or rear portions of the barrel are not swept out by the detonation at all but remain within the barrel until the reflected rarefaction wave arrives. Thus, they have a fairly long residence time in the hot gas and have ample time to approach the gas temperature. They are then gradually accelerated outward and eventually leave at a velocity approaching the sonic velocity of the carrier gas. It can thus be seen that the powder in the central portion of the barrel is the most important for coatings. The powder originally near the muzzle has not had enough time to get hot, while the powder near the breech end of the barrel does not leave until all the gas has expanded substantially back down to atmospheric pressure and thus travels quite slowly.

The sequence of events in the present electric pulse plating process is quite different, especially in the preferred modification wherein the coating powder material is injected into a barrel positioned downstream from the discharge chamber. Here all the driving energy obtained from the high intensity electric pulse discharge is supplied to a small volume of gas behind the breech of the chamber or barrel in which the coating powder is located. This gas expands down the barrel sending out a shock wave which compresses and heats the gas which originally filled the barrel. When this shock wave reaches the muzzle, the gas which originally filled the barrel and in which the powder was suspended is substantially all near the muzzle and is moving at high velocity. There is no stagnation region in this gas since the discharge-heated gases are continuing to expand and push against the barrel gases in a piston-like action. Therefore, the residence times of the coating particles in the hot gas are determined solely by the length of the barrel and the gas velocity behind the shock wave. An important result of this is that substantially all of the coating particles located in the breech and central portions of the barrel can be effectively used in producing a desired coating. A further feature is that substantially all of the gas that originally filled the barrel leaves the muzzle at velocities above its local sonic velocity when the shock velocity is very high. Therefore, higher gas and higher particle velocities are possible than is the case for the detonation gun process.

It should be realized that while the shock velocity in the detonation process can be reasonably constant since it is mainly a function of detonatable gas composition, the shock velocity in the electric pulse discharge process decays somewhat with time. This is a consequence of the expansion of the electric pulse-discharge-heated gas away from the closed end of the arc chamber. Such expansion generates rarefaction waves which are reflected off the rear portion of the arc chamber and which then propagate in the same direction as the shock wave and overtake and weaken it. This shock attenuation can be made small and can be made to occur further downstream by longer discharge chambers and supplying more electrical energy to this region. This provides a longer path for the rarefaction wave to travel before it overtakes the shock wave. The longer discharge chamber, of course, tends to lower the efficiency of the system and requires more energy supply. These various operation characteristics can be balanced by one skilled in the art to achieve the particular desired coating conditions.

The present invention utilizes an electric pulse discharge as the energy source for applying the finely-divided coating material to a base. There are four main types of apparatus which could be used to generated or store the electrical energy for such electric pulses: capacitance, inductance, rotating machinery and batteries. The use of capacitance is presently preferred in that it is especially useful in attaining high energy levels for substantially instantaneous discharge between the electrodes.

It is recognized that capacitors, for example, have previously been used to generate electric pulses for propulsion purposes. However, the prior art is useful only for acceleration of massive projectiles and required super-atmospheric pressures initially in the discharge chamber. The present invention employs an initial substantially atmospheric pressure in the arc chamber and relies on only the velocity developed by the electric pulse-heated gas to propel finely-divided particles. The coating process only requires a single electrical pulse discharge for each coating cycle which is an operating convenience. The operating cycle is repeated a considerable number of times in order to coat large areas or to apply a massive coating to a limited area.

With reference now to FIG. 1, typical apparatus can consist of a discharge chamber 10 containing a first primary electrode 12 and a second primary electrode 14. The electrode 14 also contains a trigger electrode 16 separated from electrode 14 by insulator 18. These electrodes are preferably fabricated from high melting point materials such as tungsten, tantalum, molybdenum and columbium. Electrode 12 and electrode 14 are separated from the remainder of the discharge chamber 10 by means of electrical insulators 20 and 22 respectively. A main capacitor 24 is connected between electrode 14 and electrode 12 through lines 26, 28, and 30. The capacitor 24 is charged to desired voltage by means of high voltage direct current supply 34 connected to the capacitor by means of lines 36, 38, and switch 40. A trigger pulse circuit is established between trigger electrode 16 and electrode 14 through line 26, trigger capacitor 42, switch 44, and line 46. The trigger capacitor 42 is charged from trigger electrical supply 48 through lines 50 and 52 and switch 54.

In practice, main capacitor 24 is charged to operating conditions by closing switch 40. Trigger capacitor 42 is charged by closing switch 54. When the capacitors are charged to the desired energy levels, the switches are then opened. Capacitor 24 cannot discharge because the resistance between the electrodes across the arc chamber gap is too great. A stream of inert gas, such as argon, helium, or in some instances nitrogen, hydrogen or carbon dioxide, is introduced to discharge chamber 10 through line 56 at substantially atmospheric pressure. Mixtures of two or more of the above gases might also be used. Finely divided coating material, preferably entrained in an inert carrier gas stream, is introduced to the discharge chamber through line 58. As shown in FIG. 1 the powder is introduced preferably to a barrel portion 60 located downstream from the discharge chamber 10.

Switch 44 is then closed to energize the trigger circuit between trigger electrode 16 and electrode 14. Capacitor 42 discharges creating a trigger spark within the discharge chamber. This trigger spark ionizes the gas in the chamber sufficiently so as to allow the main discharge 62 to operate between electrode 12 and electrode 14.

Discharge 62 rapidly heats up the gas within the discharge chamber and increases its pressure. This rapid temperature and pressure rise generates a shock wave which passes out through barrel 60. The combination of the shock wave and the discharge-heated gases from chamber 10 heat and propel particles 63 and impinge them against a base 64 to form thereon an adherent dense coating 66.

This operating cycle can be repeated as often as desired. Since the inert gas and powdered coating material could be introduced continuously if desired, the limiting characteristic on frequency of operation is the time required to charge the main and trigger capacitors to operating voltages. A preferred form of operation would be to pulse the separate streams of inert gas and powder feed material at the same rate that capacitors are discharged. These gases and powder streams could be introduced just prior to the electric pulse.

It should be noted that an intermittent coating process, such as described here, in contrast with a continuous coating process has a particular advantage in that the base material is not heated to an undesirably high temperature. This base has an opportunity to cool somewhat between intermittent applications of hot coating material and surrounding hot effluent gases. Decreased heating of the base prevents base distortion and minimizes possible weakening of the base-coating bond through differential thermal expansion.

Figure 2:
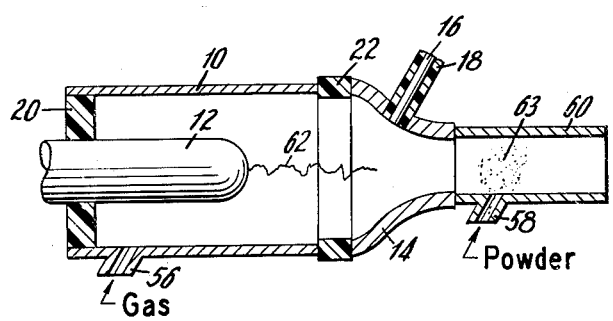
FIG. 2 shows another form of coating apparatus.

An alternate apparatus modification is shown in FIG. 2. In this modification, the electrode 12 is positioned on the longitudinal axis of the longitudinal extended discharge chamber 10 while the electrode 14 is in the form of a nozzle positioned at the outlet of the discharge chamber. Trigger electrode 16 surrounded by insulator 18 is positioned in the wall of electrode nozzle 14. A barrel portion 60 preferably connects to electrode 14. This apparatus variation is especially useful for efficiently reducing the volume of the discharge chamber and thus enables the full power of the main electric pulse to be contained within a smaller amount of gas. This creates higher chamber temperatures and pressures and also provides more efficient use of the electrical pulse energy.

The following examples describe typical operation of the electric pulse coating process.

*Example I*

Apparatus of the type shown in FIG. 1 was used. The primary electrodes were ¾-in. dia. stainless steel rods with hemispherical arcing tips. A ³⁄₃₂-in. dia. thoriated tungsten rod surrounded by an electrical insulator was centrally positioned within one of the primary electrodes so as to form a small arc gap across the face of the primary electrode between the trigger electrode and the primary electrode. The primary electrodes were spaced about 1-in. apart within an arc chamber having an internal volume of about 6 cubic inches. An outlet barrel ½-in. dia. and 4¼- in. long was positioned in the side of the discharge chamber. Argon gas at 60 c.f.h. was introduced to the discharge chamber and finely-divided tungsten powder (—325 mesh) was introduced at about 40 grams/min. in a 40 c.f.h. argon carrier gas stream to the barrel. A trigger capacitor of 3.75 microfarads capacity charged to 7–10 kv. was then discharged to form a trigger spark. This in turn caused the discharge of the main capacitor of 28.1 microfarad capacity charged to 7.5 kv. The discharge of the main capacitor created a substantial arc between the primary electrodes. The resulting shock wave and arc-heated gas rapidly passed through the barrel and ejected the tungsten powder against a brass workpiece placed near the muzzle of the arc chamber barrel. This process was repeated about 30–50 times over a 10 minute period to form a tungsten coating about 0.001 in. thick having about 30% porosity.

*Example II*

Apparatus of the type shown in FIG. 1 was used. The primary electrodes were ¾-in. dia. molybdenum rods with hemispherical arcing tips. The trigger electrode arrangement was the same as described in Example I above. The primary electrodes were spaced about 1 to 2 in. apart within an arc chamber having an internal volume of about 100 cubic inches. The current lead to one of the primary electrodes was positioned in close proximity to the back-side of the arc chamber and at right angles to the barrel. This arrangement enabled the magnetic field from the current in this lead to reinforce the shock wave created within the arc chamber and aid its passage through the barrel. Argon gas was introduced to the arc chamber and powder tungsten suspended in an argon carrier gas stream was introduced to the barrel. A trigger spark was produced by the discharge of a 4 microfarad capacitor charge to 10 kv. and storing about 200 joules of electrical energy. This triggered the main spark produced by the discharge of a 72 microfarad main capacitor charged to 15 kv. and storing about 7500 joules of electrical energy. The peak current obtained in the main arc was about 300,000–400,000 amperes. Due to the combined inductance and capacitance in the main arc circuit, this discharge oscillated at about 50 kc. The total electrical energy was discharged within about 50 microseconds. The resulting shock wave and arc-heated gas rapidly passed through the barrel and ejected the tungsten powder against a brass workpiece placed near the muzzle of the barrel. The tungsten coating was adherent and contained particles which had become molten during the coating process.

*Example III*

Apparatus of the type shown in FIG. 2 was used. The central electrode was a ¾-in. tungsten rod rounded on the arcing end. The other primary electrode was a copper nozzle which tapered from an inlet dia. of ⅞-in. to an outlet dia. of ½-in. within a ½-in. nozzle length. A ³⁄₃₂-in. dia. thoriated tungsten trigger electrode surrounded by a ceramic electrical insulator was positioned in the wall of the nozzle so as to form a trigger spark-gap. The primary electrodes were spaced about 1 to 2 inches apart. The arc charger had an internal volume of about 10 cubic inches. A ½-in dia. barrel 5 in. long was attached to the outlet end of the nozzle electrode. A gas mixture of 15 c.f.h. argon and 10 c.f.h. hydrogen was passed into the arc chamber and 6.8 micron dia. tungsten powder suspended in a 10 c.f.h. argon stream was introduced at about 40 grams/min. into the barrel. The trigger spark and main arc were discharged by means of circuitry described in Example II above. Metallographic examination of the resulting tungsten coating on a brass workpiece indicated that the tungsten particles struck the base at such high velocity that they became embedded in the base and cold-worked some of the brass. Tungsten particles having about 0–4 microns dia. were liquid when inpacted. Particles larger than 5 microns were liquid only on the surface and formed a pebbly structure. The velocity of the hot gases obtained with the same gas mixture in the same apparatus but without powder addition was measured at about 14,000 ft./sec. It is assumed that the gas velocity in this example approached this value.

*Example IV*

Apparatus of the type described in Example III was operated in a similar manner to produce a tungsten coating on Rockwell C–51 steel base. There was substantially no penetration of the tungsten particles into the base.

*Example V*

The apparatus and operating conditions of Example III above were substantially repeated using nickel powder (—325 mesh) as the coating material. The arc chamber gas was composed of 15 c.f.h. argon and 15 c.f.h. hydrogen, and the carrier gas stream for the nickel powder was 50 c.f.h. argon. An adherent coating of nickel on brass resulted.

It will be understood that the new features of process operation and apparatus construction herein disclosed may be employed in ways and forms different from those of the preferred embodiments described above without departing from the spirit and scope of the invention.

What is claimed is:

1. A process for coating objects which comprises introducing at substantially atmospheric pressure an inert gas stream into a chamber having an open end; introducing a finely-divided powder coating material into said chamber; discharging a source of high intensity electrical energy between spaced electrodes within said chamber so as to rapidly increase the pressure and temperature of said inert gas; passing a resulting shock wave and rapidly expanding hot gas along and around said finely-divided coating material so as to eject such material from said open end of said chamber; and impinging the hot high velocity coating material on the object to be coated.

2. A process according to claim 1 wherein said finely-divided powder coating material is suspended in an inert gas stream and is introduced into an elongated barrel positioned downstream from said chamber.

3. An intermittent process for coating objects which comprises performing in a cyclic manner the steps of charging a capacitor to a desired level of energy storage; introducing an inert gas into a discharge chamber having an open end; introducing finely-divided powder coating particles entrained in an inert gas into an elongated barrel located downstream from said discharge chamber; discharging said capacitor within said chamber so as to rapidly increase the pressure and temperature of said inert gas; passing a resulting shock wave and rapidly expanding hot gas along and around said finely-divided coating material so as to eject such material from said barrel; and impinging the hot high velocity coating material to an object to be coated.

4. Apparatus which comprises a discharge chamber; means for introducing an inert gas into said chamber, two primary electrodes positioned in said chamber; a trigger electrode positioned adjacent to one of said primary electrodes; an elongated barrel communicating at one end with said discharge chamber and having the other end open; means for introducing finely divided powder coating material into said barrel; means for establishing a trigger pulse between the trigger electrode and one of said primary electrodes; and means for providing a high intensity pulsed electric discharge between said primary electrodes, for projecting said coating material from the open end of said elongated barrel.

5. Apparatus which comprises a longitudinally elongated chamber having a closed end and an outlet end; means for introducing an inert gas into said chamber; a primary electrode positioned on the longitudinal axis of said discharge chamber and extending from said closed end thereof; a second primary electrode forming a nozzle at the outlet of said discharge chamber; a trigger electrode positioned in and electrically isolated from said second primary electrode; an elongated barrel communicating with said nozzle; means for establishing a trigger pulse between said trigger electrode and said second primary electrode; means for providing a high intensity pulsed electric discharge between said primary electrodes; and means for introducing finely divided powder coating material into said barrel.

References Cited by the Examiner
UNITED STATES PATENTS

| | | | |
|---|---|---|---|
| 2,661,784 | 12/53 | McMillan | 241—1 X |
| 2,714,563 | 8/55 | Poorman et al. | 117—105.2 |
| 2,852,721 | 9/58 | Hardes et al. | 315—111.4 |
| 2,858,411 | 10/58 | Gage | 313—231.5 |
| 2,919,370 | 12/59 | Giannini et al. | 313—331.5 |
| 2,922,869 | 1/60 | Giannini et al. | 117—105 |

WILLIAM D. MARTIN, *Primary Examiner.*

RICHARD D. NEVIUS, *Examiner.*